(12) United States Patent
Peecock et al.

(10) Patent No.: US 8,844,368 B2
(45) Date of Patent: *Sep. 30, 2014

(54) SYSTEM AND METHOD FOR TESTING OF BONDS OF A SEMICONDUCTOR ASSEMBLY

(75) Inventors: Benjamin K. Peecock, Suffolk (GB); Philip John King, South Woodham Ferrers (GB)

(73) Assignee: Nordson Corporation, Westlake, OH (US)

( * ) Notice: Subject to any disclaimer, the term of this patent is extended or adjusted under 35 U.S.C. 154(b) by 609 days.

This patent is subject to a terminal disclaimer.

(21) Appl. No.: 13/093,264

(22) Filed: Apr. 25, 2011

(65) Prior Publication Data

US 2011/0277556 A1    Nov. 17, 2011

(30) Foreign Application Priority Data

May 14, 2010   (EP) .................................... 10250925

(51) Int. Cl.
*G01N 3/08*  (2006.01)
*G01L 5/00*  (2006.01)

(52) U.S. Cl.
CPC ................................... *G01L 5/0033* (2013.01)
USPC .......................................................... 73/827

(58) Field of Classification Search
USPC .......................................................... 73/827
See application file for complete search history.

(56) References Cited

U.S. PATENT DOCUMENTS

| | | | |
|---|---|---|---|
| 5,176,028 A * | 1/1993 | Humphrey | 73/150 A |
| 5,374,808 A | 12/1994 | Coultrip et al. | |
| 5,641,913 A | 6/1997 | Watanabe | |
| 5,969,262 A * | 10/1999 | Ino et al. | 73/827 |
| 6,301,971 B1 | 10/2001 | Sykes | |
| 6,523,419 B1 * | 2/2003 | Nonaka et al. | 73/827 |
| 6,912,915 B2 * | 7/2005 | Jian et al. | 73/827 |
| 7,176,703 B2 * | 2/2007 | Flechsig et al. | 324/754.02 |
| 7,555,961 B2 | 7/2009 | Sykes | |
| 7,597,006 B2 * | 10/2009 | Aiba | 73/827 |
| 7,730,790 B2 | 6/2010 | Sykes | |
| 7,905,152 B2 | 3/2011 | Sykes | |

FOREIGN PATENT DOCUMENTS

JP         56160639 A        12/1981

OTHER PUBLICATIONS

European Patent Office, European Search Report in EP Application No. 10250925, Oct. 5, 2010.

* cited by examiner

*Primary Examiner* — Lisa Caputo
*Assistant Examiner* — Octavia D. Hollington
(74) *Attorney, Agent, or Firm* — Wood, Herron & Evans, L.L.P.

(57) ABSTRACT

An apparatus applies a pull test to a bond of a semi-conductor assembly, the bond including a ball or a bump of solder. The apparatus includes a probe including a straight, thermally conductive pin; a heater for heating a tip of the probe; a holder for supporting the probe and including a clamping mechanism that is configured to provide a clamping force on the probe; an actuation device for moving the holder and the probe up and down; and a pull force applier for applying a pull force on the holder. A force measuring system measures a force applied to the probe during the pull test to determine the strength of the bond.

18 Claims, 8 Drawing Sheets

SYSTEM AND METHOD FOR TESTING OF BONDS OF A SEMICONDUCTOR ASSEMBLY

FIELD OF THE INVENTION

The invention relates to a system and method for pull testing of bonds of semiconductor assemblies. In particular, the invention relates to a system and method for testing the pull strength of bonds formed from a ball or bump of meltable material, such as solder.

BACKGROUND TO THE INVENTION

In order to test the quality of the manufacturing processes used in the production of printed circuit board ("PCB") and/or semiconductor assemblies, destructive and non-destructive mechanical strength tests are performed. Typically the testing is performed on a bond which is providing electrical or thermal continuity between two materials. For bonds that are of a suitable shape and size the test force can be applied by gripping, hooking or shearing one of the materials making the bond.

There are some bonds where this is not possible, typically where the bond is a ball or bump of solder on the surface of a PCB or a semiconductor substrate, but is of unusual shape or size or which is difficult to access using gripping jaws. As an alternative means of applying a test force, it is known to melt the bond, and then allow the bond to re-solidify around a test tool. The test tool can then be moved to apply a test force to the re-solidified bond. An example of this type of system used for pull testing is described in U.S. Pat. No. 5,641,913 to Watanabe.

In practice, this operating principle has been implemented by adapting existing bond testing machines designed for hooking or gripping bonds to perform a pull test. A machine currently used in this way is the Dage 4000 multifunction Bondtester, available from Dage Holdings Limited, 25 Faraday Road, Rabans Lane Industrial Area, Aylesbury, Buckinghamshire, United Kingdom. A test pin is attached to the hook ordinarily used for pull testing. The test pin is held in place by the hook, which is directly attached to a beam fitted with strain gauges to measure the force applied during the test. One end of the pin has a 90 degree bend formed which engages the hook and transfers the force to the tip of the pin. The system uses a cartridge heater inserted into a relatively large titanium block which mechanically supports a heater and a thermocouple. The hook is accurately aligned above the titanium heater block so that the straight portion of the test pin passes through a close fitting hole running through it.

The method of operation of this equipment is as follows. The sample to be tested is rigidly fitted into a work holder attached to a horizontally movable table. The operator uses joystick controls to move the specific test site on the sample directly under the test pin, typically using a microscope to achieve the required accuracy. The operator lowers the whole load cell and test pin assembly, which is mounted to a motorized vertical stage, using the joystick control until the tip of the test pin is resting on the top of the solder ball/bump to be tested. The test button is pushed which heats the probe, through the titanium heater block, to a pre-determined temperature. Once the solder ball/bump melts, the very tip of the test pin, under its own weight, drops into the molten pool of solder. When the desired temperature has been reached, the heater is turned off, which allows the test pin to start cooling and the solder to solidify. Once solidified, the pin, the solder and heater block are cooled more rapidly by means of a cold air jet directed at them. Once a predetermined temperature has been achieved the test pin is anchored into the body of the solder ball/bump and the destructive pull test can be started. The whole load cell assembly is automatically driven upwards which causes the pull hook to apply an axial load on the pin and therefore the bond. A beam in the load cell flexes and calibrated strain gauges measure the force. As the bond fails, the strain gauges see the force dropping off and the maximum force prior to failure is recorded. The recorded force is then stored in a database.

This bond testing apparatus and method suffers from a number of disadvantages in measurement accuracy, speed of operation, and usability, and it is an object of the present invention to overcome some or all of these disadvantages, or at least to provide a useful alternative.

SUMMARY OF THE INVENTION

The present invention is defined in the appended independent claims, to which reference should be made. Preferred aspects of the invention are set out in the dependent claims.

In one aspect, the invention comprises an apparatus for applying a pull test to a bond of a semi-conductor assembly, the bond comprising a ball or a bump of solder, the apparatus comprising:

a probe, said probe having a longitudinal axis; a heater for heating a tip of said probe to a temperature at or above a temperature at which the bond is melted;

a holder for supporting said probe; an actuation device for moving up and down said holder and said probe supported in said holder;

a means for applying a pull force on said holder which in turn applies a pull force to said probe along the longitudinal axis of the probe; and a force measuring system for measuring a force applied to said probe during the pull test, wherein after said probe tip has been heated to a temperature at or above a temperature at which the bond is melted, said probe tip is brought into contact with the bond, the bond is melted by heating of the probe and the bond is cooled and solidified to fix the probe tip in the bond, the probe is then retracted by the pull force applying means to apply a pull force to the bond, which pull force is measured by said force measuring system.

By applying the pull force along the longitudinal axis of the probe, measurement accuracy is improved in comparison with the prior art. In the prior art system, employing a bent probe pin, the force applied via the bend in the test pin is not directly above the test site and generates a small bending moment. This can also result in increased friction between the test pin and the hole in the heater block, which can adversely affect the force measurement. By applying the force in line with the longitudinal axis of the probe, bending moments are eliminated and frictional problems reduced.

Furthermore, in the prior art system, the maximum force applied by the pull hook engaging the test pin is limited by the strength of the bend in the test pin. When this maximum force is exceeded, the pin straightens out. By applying the pull force in line with the longitudinal axis of the probe, and not through a bend, this problem is eliminated.

Preferably, the probe is a straight pin coupled to the holder by a probe retaining mechanism. Preferably, the probe is retained in the holder by a clamping mechanism. Preferably the clamping mechanism provides a clamping force on a longitudinal shaft of the probe. The use of a clamp of this type, together with a straight probe pin, allows the probe to be readily removed from the apparatus when a test is completed. In contrast, in the prior art system, once the test has been completed the test pin is mechanically trapped in the heater block, as it has the solder ball on one end and the bend on the other. This means either the pin has to be cut or the heat cycle has to be re-run and the solder ball removed manually whilst molten so that the probe can be removed. This has a significant impact not only on speed of operation but also on cost. The test pins are precisely formed and for a consumable item are relatively expensive, and so it is desirable to be able to clean and reuse them.

Also, with the use of a straight, clamped pin, the operator requires less contact with the hot end of the holder during loading of the probe as the holder can be simply driven down onto a pin that is held vertically in a loading tray, and then clamped. A thermal shield can also be provided surrounding the heater, to reduce the risk of burn injuries and to reduce undesirable heat loss from the probe during the heating phase of operation. In contrast, with the prior art system manual loading of the probe was necessary, which was more time consuming and cumbersome. It also exposed the operator to a risk of burn injuries when contacting the holder, as parts of it can be hot, particularly if the solder ball has been re-melted following a test.

With the probe rigidly clamped both a 'Push' and 'Pull' test can be performed. It also enables a 'Fatigue' test to be run where the load is cycled between a compressive and a tensile test up to predetermined forces or for a fixed number of cycles. With the prior art system, it was not possible to apply push force to the pin. Therefore, push tests and fatigue tests were not possible with the prior art system.

Preferably, the clamping mechanism is pneumatically operated. However any suitable operating mechanism may be used, such as, for example, electrical or magnetic mechanisms. The clamping mechanism may comprise a collet surrounding the probe, the collet having a tapered external surface, and a piston, wherein, in use, actuation of the piston causes the piston to travel along the tapered surface, or causes the tapered surface to be driven against another surface, to clamp the collet around the probe. An additional or alternative, manually operable clamping mechanism may also be provided. Preferably, the collet is biased into an unclamped position.

Preferably, the heater comprises a thermally conductive tube which surrounds at least a part of said probe and a heating element which surrounds at least a part of said tube. In this way, the heat source is much closer to the test pin than in the prior art, reducing the energy required to perform the test as well as the time to perform the complete cycle. The thermal mass that needs to be heated and cooled has also been significantly reduced by the present invention.

Preferably, the heater wire is connected to an electrical power source that acts to heat the heater wire. Preferably, the thermally conductive tube is electrically insulating. Preferably, the thermally conductive tube is formed from a ceramic material. An example of a suitable ceramic material is an Aluminium Nitride/Boron Nitride ceramic composite, available from Dynamic Ceramic Ltd, of Crewe Hall, Weston Road, Crewe, CW1 6UA United Kingdom.

Preferably, the apparatus further includes a thermocouple located adjacent to the probe. Preferably, the thermocouple is located on the thermally conductive tube, and more preferably at the end of the thermally conductive tube closest to the bond under test when in use. An electrically insulating tube allows the thermocouple to be placed directly on it. The thermocouple can be used to determine the temperature of the probe both during a heating phase of the bond test and during a cooling phase. The temperature of the probe can be recorded and controlled throughout the bond test. It is advantageous to control the melting and cooling of the bond under test to mimic as closely as possible the process carried out during manufacture. This ensures that the form of the bond and its material properties under test match those of manufactured bonds.

Preferably, the apparatus includes a cooling system for cooling the probe. Preferably the cooling system comprises a source of compressed air, a nozzle or outlet connected to the source of compressed air, the nozzle or outlet arranged to provide a flow of compressed air in the vicinity the probe, and a valve configured to control the supply of compressed air from the source to the nozzle or outlet.

Preferably the apparatus further includes a movable platform on which a semiconductor sample to be tested is mounted. Preferably, an array of probes is also mounted on the movable platform. By having an array of probes, preferably pre-loaded into a carrier tray, and with known positions for the test sites, an automatic test routine is possible. Motorized controls can be used to move the holder and platform relative to each other to automate picking up probes, performing a test and then dropping the used probes into a collection receptacle.

In another aspect, the invention comprises an apparatus for applying a pull test to a bond of a semi-conductor assembly, the bond comprising a ball or a bump of solder, the apparatus comprising:

a probe;

a heater for heating a tip of said probe to a temperature at or above a temperature at which the bond is melted;

a holder for supporting said probe;

an actuation device for moving up and down said holder and said probe supported in said holder;

a means for applying a pull force on said holder which in turn applies a pull force to said probe; and a force measuring system for measuring a force applied to said probe during the pull test, wherein after said probe tip has been heated to a temperature at or above a temperature at which the bond is melted, said probe tip is brought into contact with the bond, the bond is melted by heating of the probe and the bond is cooled and solidified to fix the probe tip in the bond, the probe is then retracted by the pull force applying means to apply a pull force to the bond, which pull force is measured by said force measuring system, and wherein said heater comprises a thermally conductive tube which surrounds at least a part of said probe and a heating element which surrounds at least a part of said tube.

With this heater arrangement, the heat source is much closer to the test pin than in the prior art, reducing the energy required to perform the test as well as the time to perform the complete cycle. The thermal mass that needs to be heated and cooled is also significantly reduced. This speeds up the testing process.

Preferably, the heater wire is connected to an electrical power source that acts to heat the heater wire. Preferably, the thermally conductive tube is not electrically conductive. Preferably, the thermally conductive tube is formed from a ceramic material.

Preferably the apparatus further includes a thermocouple located adjacent to the probe. Preferably, the thermocouple is located on the thermally conductive tube, and more preferably at the end of the thermally conductive tube closest to the bond under test in use. The thermocouple can be used to determine the temperature of the probe both during a heating phase of the bond test and the cooling phase. The temperature of the probe can be recorded and controlled throughout the bond test. It is advantageous to control the melting and cooling of the bond under test to mimic as closely as possible the process carried out during manufacture. This ensures that the form of the bond and its material properties under test match those of manufactured bonds.

The apparatus preferably further includes a thermal shield surrounding the heater to reduce the risk of burn injuries and to reduce undesirable heat loss from the probe during the heating phase of operation.

Preferably, the apparatus includes a cooling system for cooling the probe. Preferably the cooling system comprises a source of compressed air, a nozzle or outlet connected to the source of compressed air, the nozzle or outlet arranged to direct a jet of compressed air at the probe, and a valve configured to control the supply of compressed air from the source to the nozzle or outlet.

Preferably, the probe has a longitudinal axis and said holder applies a pull force to said probe along the longitudinal axis of the probe Preferably, the probe is a straight pin coupled to the holder by a probe retaining mechanism. Preferably, the probe is retained in the holder by a clamping mechanism. Preferably the clamping mechanism provides a clamping force on a longitudinal shaft of the probe and is symmetrically disposed about the shaft.

Preferably, the clamping mechanism is pneumatically operated. However any suitable clamping mechanism may be used which may be operated, for example, electrically or magnetically. The clamping mechanism may comprise a collet surrounding the probe, the collet having a tapered external surface, and a piston, wherein, in use, actuation of the piston causes the piston to travel along the tapered surface, or causes the tapered surface to be driven against another surface, to clamp the collet around the probe. An additional or alternative, manually operable clamping mechanism may also be provided. Preferably, the collet is biased into an unclamped position.

Preferably the apparatus further includes a movable platform on which a semiconductor sample to be tested is mounted. Preferably, an array of probes is also mounted on the movable platform. By having an array of probes, preferably pre-loaded into a carrier tray, and with known positions for the test sites, an automatic test routine is possible. Motorized controls can be used to move the holder and platform relative to each other to automate picking up probes, performing a test and then dropping the used probes into a collection receptacle.

In a further aspect, the invention comprises a method of testing a bond on a semiconductor assembly, the bond comprising a ball or a bump of solder, the method comprising the steps of:
applying a tip of a thermally conductive probe to the bond; heating the tip of said probe to a temperature at or above a temperature at which the bond is melted;
cooling the tip of the probe, or allowing the tip of the probe to cool, to a temperature at which the bond is solidified, wherein the tip of the probe is embedded in the bond;
applying a pull force on the probe, and recording the force applied to the probe during the step of applying a pull force, wherein the probe has a longitudinal axis and the step of applying a pull force comprises applying a pull force on the probe along the longitudinal axis of the probe.

Preferably, the method includes the step of applying a force on the probe during the step of heating, to push the probe into the bond as it melts. Alternatively, the method includes the step of resting the probe on the bond during the step of heating, to allow the probe to sink into the bond as it melts under its own weight.

In a still further aspect, the invention comprises a method of testing a bond on a semiconductor assembly, the bond comprising a ball or a bump of solder, the method comprising the steps of:
applying a tip of a thermally conductive probe to the bond; heating the tip of said probe to a temperature at or above a temperature at which the bond is melted;
cooling the tip of the probe, or allowing the tip of the probe to cool, to a temperature at which the bond is solidified, wherein the tip of the probe is embedded in the bond;
applying a pull force on the probe to remove the bond from the semiconductor assembly, and recording the force applied to the probe during the step of applying a pull force,
wherein the step of heating comprises providing a thermally conductive tube which surrounds at least a part of said probe and a heating element which surrounds at least a part of said tube, and passing a current through the heating element to heat the probe.

In a further aspect, the invention comprises a method of testing a bond on a semiconductor assembly, the bond comprising a ball or a bump of solder, the method comprising the steps of:
clamping a thermally conductive probe into a probe holder, wherein the probe comprises a straight pin, and the step of clamping the probe comprises moving the probe holder and the probe relative to one another so that the probe is positioned within the holder and clamping a longitudinal shaft of the probe;
applying a tip of the probe to the bond;
heating the tip of said probe to a temperature at or above a temperature at which the bond is melted;
cooling the tip of the probe, or allowing the tip of the probe to cool, to a temperature at which the bond is solidified, wherein the tip of the probe is embedded in the bond;
applying a pull force on the probe through the probe holder, and recording the force applied to the probe during the step of applying a pull force, and
releasing the probe from the probe holder.

Preferably, the step of moving the probe holder and the probe relative to one another so that the probe is positioned within the holder is performed under automated control.

Preferably the step of moving the probe holder and the probe relative to one another so that the probe is positioned within the holder comprises moving the probe laterally so that it is aligned with the probe holder and subsequently moving the probe holder vertically over the probe.

Preferably, the method further includes the step of moving a receptacle to a position underneath the probe holder subsequent to the step of applying pull force and the step of releasing the probe from the probe holder comprises releasing the probe into the receptacle.

Preferably the step of clamping comprises clamping a collet around a longitudinal shaft of the probe under automated control.

In yet a further aspect, the invention comprises an apparatus for applying a pull test to a bond of a semi-conductor assembly, the bond comprising a ball or a bump of solder, the apparatus comprising:
a probe, said probe comprising a straight, thermally conductive pin;
a heater for heating a tip of said probe to a temperature at or above a temperature at which the bond is melted;
a holder for supporting said probe, the holder comprising a clamping mechanism that is configured to provide a clamping force on the probe;
an actuation device for moving up and down said holder and said probe supported in said holder;

a means for applying a pull force on said holder which in turn applies a pull force to said probe; and a force measuring system for measuring a force applied to said probe during the pull test, wherein after said probe tip has been heated to a temperature at or above a temperature at which the bond is melted, said probe tip is brought into contact with the bond, the bond is melted by heating of the probe and the bond is cooled and solidified to fix the probe tip in the bond, the probe is then retracted by the pull force applying means to apply a pull force to the bond, which pull force is measured by said force measuring system.

The use of straight probes allows the loading of the probes into the holder to be simplified and even automated. The holder simply needs to be driven down onto an aligned probe pin and then clamped about its shaft. In contrast, in the prior art system using a bent probe pin engaged with a hook, loading of the probe pin had to be done manually and required considerable dexterity.

Preferably, the apparatus further comprises a plurality of probes arranged in predetermined positions, and an automatic probe loading mechanism configured to move either the holder or at least one of the probes, to bring a probe into alignment with the holder. Preferably, the apparatus further includes a collection receptacle that can be positioned underneath the probe holder to receive used probes following a test.

Preferably the apparatus further includes a movable platform on which a semiconductor sample to be tested is mounted. Preferably, an array of probes is also mounted on the movable platform. By having an array of probes, preferably pre-loaded into a carrier tray, and with known positions for the test sites an automatic test routine is possible. An automatic probe loading mechanism can be used to move the holder and platform relative to each other to automate the picking up of probes. The test can then be performed and the used probe dropped into a collection receptacle.

In yet another aspect, the invention comprises an apparatus for applying a pull test to a bond of a semi-conductor assembly, the bond comprising a ball or a bump of solder, the apparatus comprising:

a plurality of thermally conductive probes positioned in predetermined locations;

a holder for supporting a probe, the holder comprising a clamping mechanism that is configured to provide a clamping force on a probe;

an automatic probe loading mechanism configured to move either the holder or at least one of the probes, to bring a probe into alignment with the holder;

an actuation device for moving said holder and said probe supported in said holder towards and away from the bond;

a heater for heating a tip of said probe to a temperature at or above a temperature at which the bond is melted;

a means for applying a pull force on said holder which in turn applies a pull force to said probe; and a force measuring system for measuring a force applied to said probe during the pull test, wherein after said probe tip has been heated to a temperature at or above a temperature at which the bond is melted, said probe tip is brought into contact with the bond, the bond is melted by heating of the probe and the bond is cooled and solidified to fix the probe tip in the bond, the probe is then retracted by the pull force applying means to apply a pull force to the bond, which pull force is measured by said force measuring system.

Preferably, the automatic probe loading mechanism comprises an electronic controller and a memory in which the position of each of the plurality of probes is stored.

Preferably, the apparatus further includes a collection receptacle that can be positioned underneath the probe holder to receive used probes following a test. Preferably the automatic probe loading mechanism is configured to control the position of the collection receptacle relative to the probe holder.

Preferably the apparatus further includes a movable platform on which a semiconductor sample to be tested is mounted. Preferably, an array of probes is also mounted on the movable platform. By having an array of probes, preferably pre-loaded into a carrier tray and with known positions for the test sites, an automatic test routine is possible. An automatic probe loading mechanism can be used to move the holder and platform relative to each other to automate the picking up of probes. The test can then be performed and the used probe dropped into a collection receptacle.

Preferably, each of the plurality of probes comprises a straight thermally conductive pin.

Each probe can be arranged to be upstanding so that, in use, the holder can be lowered over each probe and the probe then clamped prior to performing a test. Following a test, the used probe can be unclamped and can be slid out of the holder or may simply fall out of the holder under its own weight.

In a further aspect, the invention comprises a method of testing a bond on a semiconductor assembly, the bond comprising a ball or a bump of solder, the method comprising the steps of:

providing a plurality of thermally conductive probes at predetermined positions;

moving either at least one of the probes or a probe holder under automatic control to bring a probe into alignment with the probe holder; clamping the probe to the probe holder, moving the probe and holder relative to the bond to apply a tip of the probe to the bond;

heating the tip of said probe to a temperature at or above a temperature at which the bond is melted;

cooling the tip of the probe, or allowing the tip of the probe to cool, to a temperature at which the bond is solidified, wherein the tip of the probe is embedded in the bond;

applying a pull force on the probe through the probe holder, and recording the force applied to the probe during the step of applying a pull force, moving a receptacle relative to the probe holder; and releasing the probe from the probe holder into the receptacle.

Preferably the step of moving either at least one of the probes or a probe holder under automatic control to bring a probe into alignment with the probe holder comprises moving the at least one of the probes laterally to a position underneath the probe holder.

Preferably, the step of providing a plurality of thermally conductive probes at predetermined positions comprises mounting a carrier tray holding the probes to a movable platform.

Preferably, each of the plurality of probes comprises a straight thermally conductive pin.

In a still further aspect, the invention provides an apparatus for applying a pull test to a bond of a semi-conductor assembly, the bond comprising a ball or a bump of solder, the apparatus comprising:

a probe;

a heater for heating a tip of said probe to a temperature at or above a temperature at which the bond is melted;

a holder for supporting said probe, wherein the holder comprises a clamp for retaining the probe, a drive mechanism coupled to the clamp and having a active position and a resting position, wherein movement of the drive mechanism from the resting position to the active position causes the clamp to tighten around the probe, and a manual adjustment mechanism coupled to the drive mechanism and configured to adjust the resting position of the drive mechanism;

an actuation device for moving said holder and said probe supported in said holder towards and away from the bond in use;

a means for applying a pull force on the probe; and a force measuring system for measuring a force applied to said probe during the pull test, wherein after said probe tip has been heated to a temperature at or above a temperature at which the bond is melted, said probe tip is brought into contact with the bond, the bond is melted by heating of the probe and the bond is cooled and solidified to fix the probe tip in the bond, the probe is then retracted by the pull force applying means to apply a pull force to the bond, which pull force is measured by said force measuring system.

Preferably, the clamp is a collet. Preferably, the drive mechanism is a piston and cylinder coupled to a pneumatic or hydraulic control system. Preferably, the piston abuts the collet and the manual adjustment mechanism is configured to adjust a resting position of the piston.

Preferably the manual adjustment mechanism allows a probe to be held in the clamp in a friction fit prior to a pull test without activating the automated clamping mechanism. A greater clamping force can subsequently be applied during the pull test by activating the automated clamping mechanism.

Preferably the manual adjustment mechanism can alternatively be used instead of the automatic clamping mechanism to cause the clamp to tighten around the probe sufficiently for applying the pull test to the bond.

BRIEF DESCRIPTION OF THE DRAWINGS

An example of the invention is described in detailed with reference to the accompanying drawings, in which.

DETAILED DESCRIPTION

Figure 1:
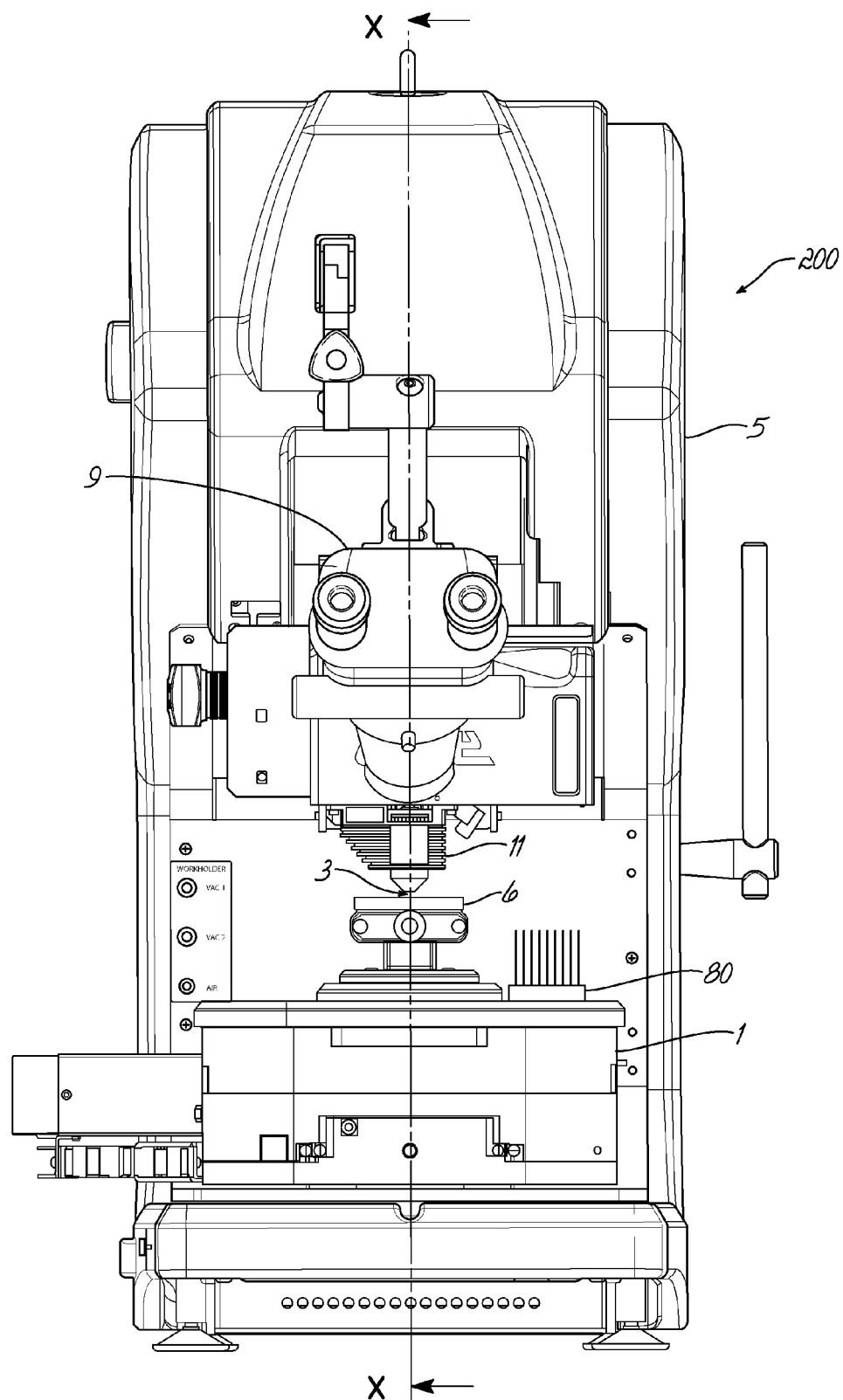
FIG. 1 is a front view of a bond testing apparatus in accordance with the invention.
Figure 2:
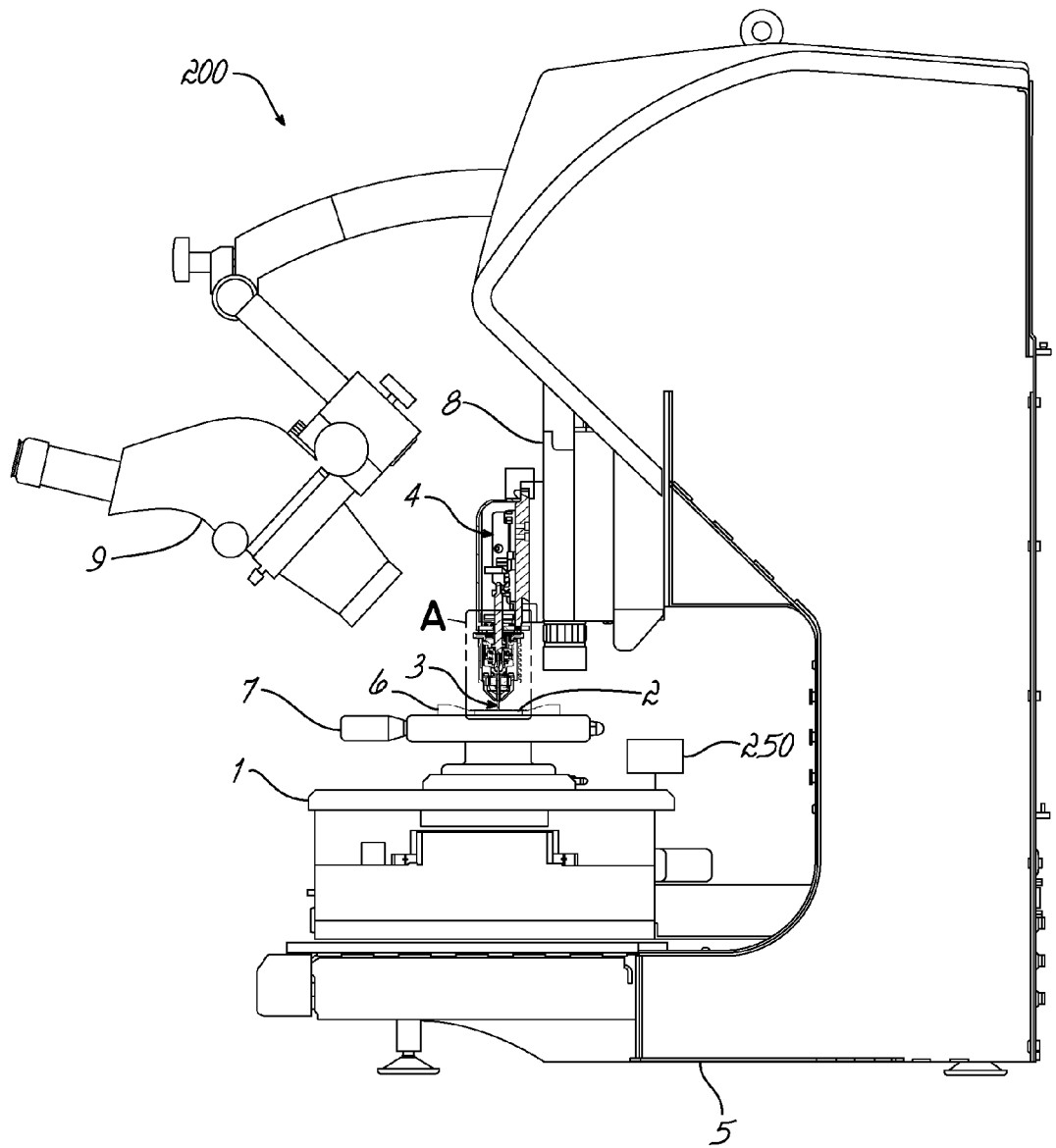
FIG. 2 is a cross-sectional view of the apparatus taken along line X-X of FIG. 1.

FIG. 1 is a front view of a bond testing apparatus or machine 200 in accordance with the invention. FIG. 2 is a lateral cross-section of the same machine 200 through the line X-X. The machine 200 comprises a stage table 1, on which a semiconductor assembly 2, having a bond or bonds to be tested, is mounted.

The machine 200 shown in FIGS. 1 and 2 is configured to perform pull tests and push tests on bonds, and in particular solder bonds. A probe 3 is held in a vertically movable cartridge assembly 4. The probe is used to contact a bond, melt the bond, sink into the melting bond, cool the bond to re-solidify it and then apply a pulling force on the bond to test its strength.

The machine 200 shown in FIGS. 1 and 2 comprises a stationary chassis 5 to which the moving parts of the machine 200 are attached. The chassis 5 is designed to sit on a workbench or table. Attached to the chassis 5 is the movable stage table 1, on which the semiconductor assembly or sample 2 under test is mounted. The stage table 1 is movable in the horizontal plane, herein referred to as the X-Y plane, relative to the chassis 5. This movement of the stage table 1 is achieved achieve and controlled using stepper or servo motors (not shown). A sample holder 6 is fixed to the stage table 1 using a threaded bolt and nut assembly, although any suitable fixing means may be used. The sample holder 6 comprises a clamp in which semiconductor samples of different sizes can be held. The clamp is adjusted using a handle 7. This type of stage table 1 and sample holder 6 arrangement is well known, and can be found in the Dage 4000 Multipurpose Bond Tester, available from Dage Holdings Limited, 25 Faraday Road, Rabans Lane Industrial Area, Aylesbury, Buckinghamshire, United Kingdom. However, the assembly under test can be secured in position on the stage table 1 by several different means. A vacuum chuck can be used to secure larger substrates or devices to the table. Also shown in FIG. 1 is a tray of probes 80, located on the stage table 1.

The machine 200 also comprises the cartridge assembly 4 to which the probe 3 is coupled. The cartridge 4 and probe 3 are movable in a vertical direction, normal to the surface of the semiconductor assembly 2 (herein referred to as the Z direction) relative to the chassis 5 and stage table 1. Movement of the cartridge 4 and probe 3 relative to the chassis 5 is again achieved using a stepper or servo motor (not shown) to drive a lead screw or ball screw 8 mounted to the chassis 5. The cartridge 4 is mounted on a nut (not shown) on the ball screw 8 and so translates travels up or down in the Z direction when the screw 8 is rotated, but other suitable drive mechanisms may be used, such as a solenoid, as is well known in the art. The vertical drive arrangement illustrated in FIGS. 1 and 2 can be found in the Dage 4000 Multipurpose Bond Tester, referenced above.

The machine 200 is typically controlled by a personal computer (PC) 90 and including suitable user interface devices, such as a keyboard and screen and one or more joysticks (not shown). The machine 200 also includes a microscope 9 directed at the sample 2 under test to aid accurate positioning of the probe 3. These user control features can also be found in the Dage 4000 Multipurpose Bond Tester, referenced above.

Figure 3:
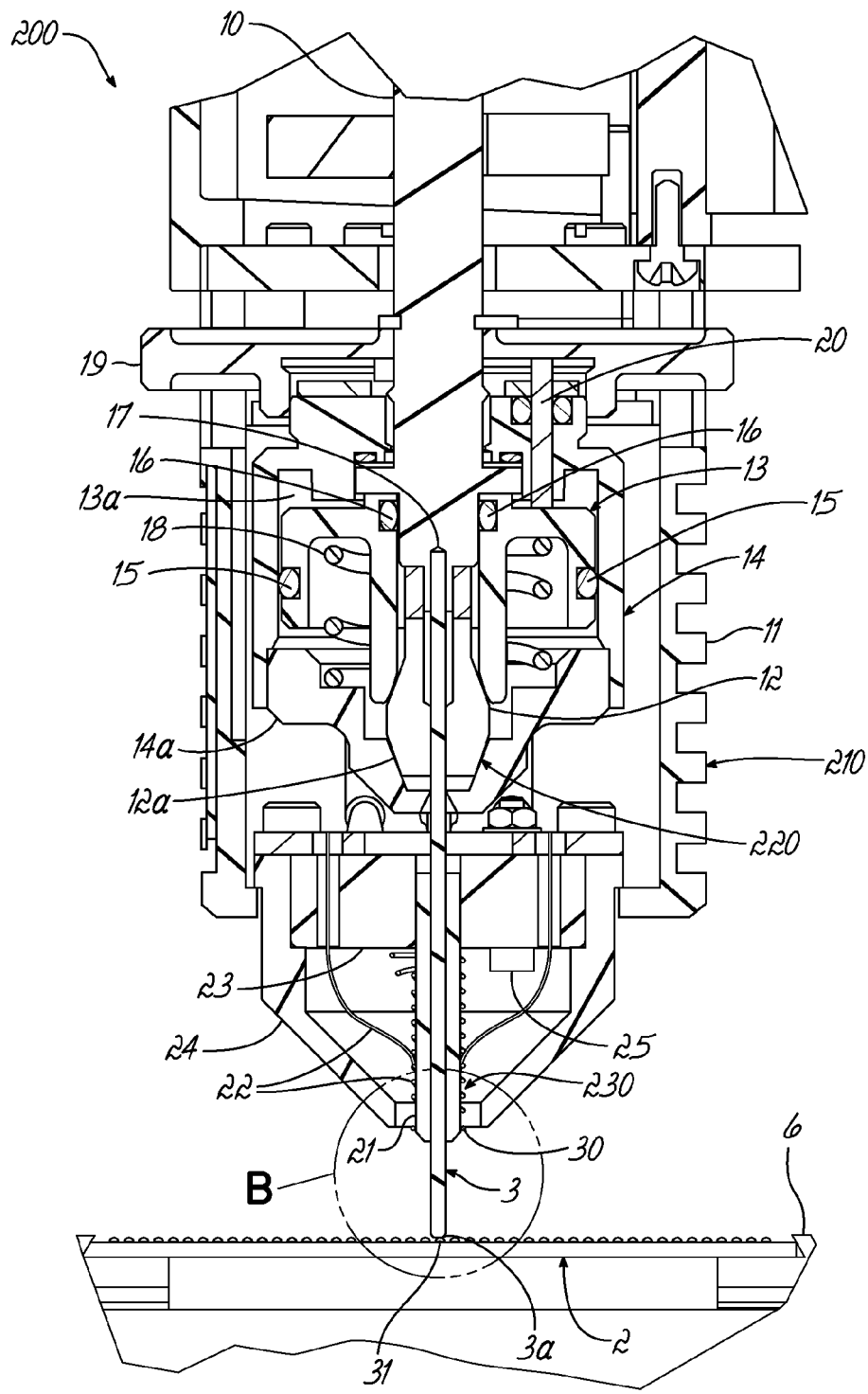
FIG. 3 is a detailed view of portion A of FIG. 2.

FIG. 3 shows the probe 3 of FIG. 2, and the manner in which the probe 3 is mounted to a pull shaft 10 of the cartridge 4 in more detail. The probe 3 comprises a thermally conductive pin 3 held in a probe holder 210 (hereinafter "holder") using collet 12, which is coupled to the pull shaft 10 within a probe housing 11. The tip 3a of the probe 3 is coated or dipped in solder to ensure a good wetting action when in contact with bonds under test.

The holder 210 may include a clamping mechanism 220. The clamping mechanism 220 used to clamp the probe 3 to the pull shaft 10 is driven pneumatically. However, other mechanisms based on electrical or magnetic actuators may also be used. The clamping mechanism 220 comprises a steel collet 12 that surrounds a portion of the shaft of the probe 3. The collet 12 is clamped tightly around the shaft of the probe 3 by the action of a piston 13 moving within a cylinder 14 that houses the collet 12. The cylinder 14 is closed by a cylinder end cap 14a that is threaded onto the bottom of cylinder 14.

Figure 4:
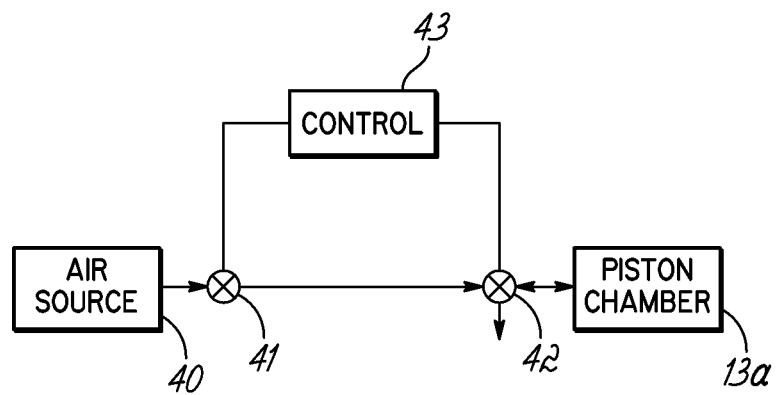
FIG. 4 is a schematic illustration of the pneumatic components of the probe clamping system of FIG. 3.

The piston 13 abuts the collet 12 and drives a tapered outer surface 12a of the collet 12 into a corresponding tapered portion of the cylinder end cap 14a, thereby clamping the collet 12 around the upper end of probe 3. The piston 13 is driven pneumatically using compressed air which is supplied to piston chamber 13a that is provided between the piston 13 and the cylinder 14. O-rings 15, 16 are used to provide a seal between the piston 13 and the cylinder 14 and the piston 13 and the pull shaft 10. A probe backstop 17 is provided on the pull shaft 10 to limit the travel of the probe 3 within the holder 210. The piston 13, the cylinder 14 and the pull shaft 10 are all formed from steel in the embodiment shown. A spring 18 is provided between the piston 13 and the cylinder end cap 14a to bias the piston 13 away from the collet 12 in the absence of a pneumatic force on the piston 13. The pneumatic components of the clamping mechanism 220 are also illustrated schematically in FIG. 4. FIG. 4 shows the piston chamber 13a connected to a source of compressed air 40, which may be mounted to the chassis 5. The supply of compressed air 40 to drive the piston 13 is regulated by a supply valve 41, which is electronically controlled by control 43 as described later. Exhausting of compressed air from the piston chamber 13a to release the clamp is controlled by an exhaust valve 42, which is also electronically controlled by control 43.

Other clamping arrangements are possible. For example, a piston might be used to travel along a tapered surface of a collet to thereby squeeze it around the probe 3. Alternatively, instead of a collet, directly actuated clamp members abutting the probe shaft may be employed. An advantage of all these clamping arrangements, in combination with the use of a straight probe 3, is that the probe 3 can be easily loaded and unloaded from the holder 210 and the process can be completely automated.

A manual clamp adjustment mechanism is also provided which may be used instead of or in addition to the pneumatic clamping mechanism 220 described above. When used in addition to the pneumatic clamping mechanism 220, the manual clamp adjustment mechanism is used to set the resting position of the piston 13, and so open up or close down the internal surfaces of the collet 12. The manual clamp adjustment mechanism comprises an annular plate 19 that is fitted on a screw thread (not shown) on the back of the cylinder 14. The plate 19 abuts one end of three downwardly extending dowel pins 20 (only one shown) that also abut the back surface of the piston 13 at their other ends. The plate can be moved down or up on the screw thread by rotating the plate 19. When the plate 19 is moved down, it closes down the collet 12. When the plate 19 is moved up, it the opens up the collet 12. The manual clamp adjustment mechanism can be used by itself, without the need for the pneumatic clamping mechanism 220, by simply rotating the annular plate 19 until it moves downwardly far enough to securely clamp the probe 3.

In order to heat the probe 3, and in particular that portion of the probe 3 in contact with the bond 31 under test so that the bond 31 melts, a heater 230 is provided around a lower portion of the probe 3. The heater 230 comprises a ceramic tube 21 that fits closely around the probe 3 and a heater wire 22 that is wound around or otherwise laid on the outer surface of the tube 21. The tube 21 is formed from thermally conductive, but electrically insulating, ceramic with walls 0.95 mm thick. The material of the ceramic tube 21 is an Aluminium Nitride/Boron Nitride Ceramic composite. The heater wire 22 provides heat by resistive heating. The heater wire 22 is connected to an electric power source (not shown in FIG. 3). An electric current is passed through the heater wire 22 to heat the ceramic tube 21 and the probe 3. The heater wire 22 is formed from Nickel-Chrome (Nichrome). The ceramic tube 21 may be formed with grooves (not shown) on its outer surface that receive the heater wire 22 and ensure good thermal contact. Other forms of heating as an alternative or in addition to resistive heating may be used, such as, for example, induction heating or the use of a hot air jet or jets. An insulating barrier 23 is provided between the heater 230 and the clamp assembly 220. A heat shield 24 is provided around the heater 230.

Figure 5:
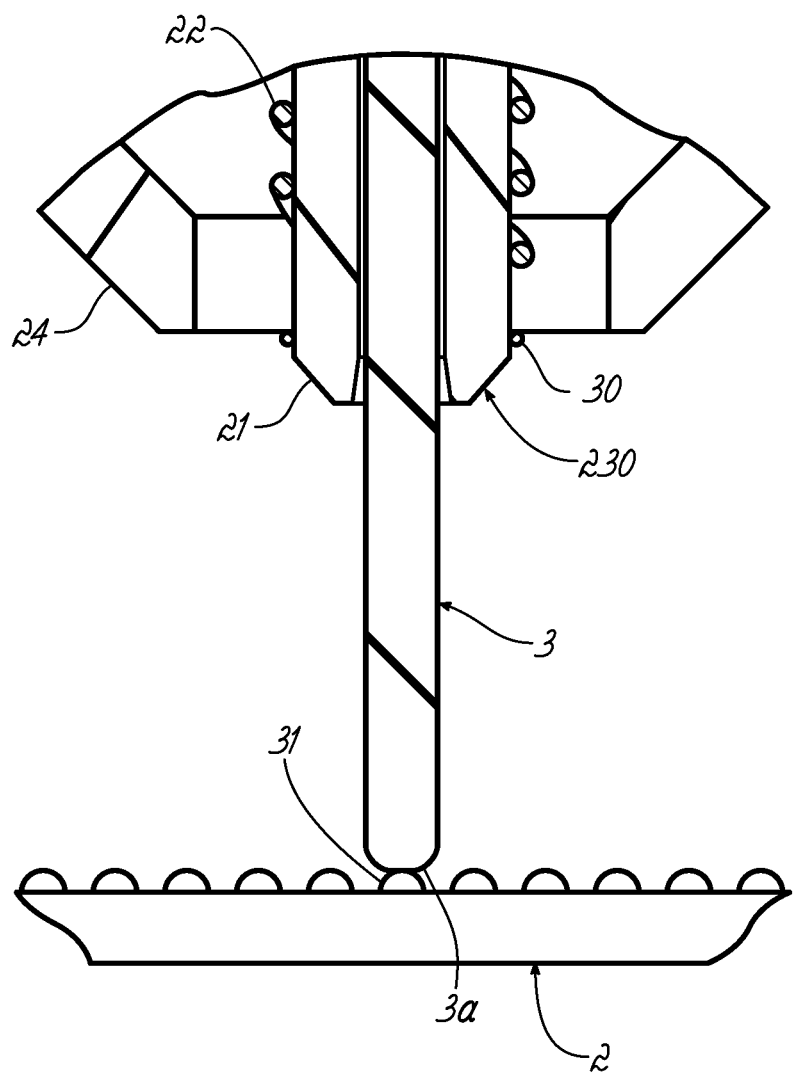
FIG. 5 is a detailed view of portion B of FIG. 3.

As shown in FIG. 5, a thermocouple 30 is positioned on the bottom end of the ceramic tube 21. The thermocouple 30 provides an indication of the temperature of the probe 3 and so an indication of the temperature of the bond 31 under test. The thermocouple 30 is a Type K thermocouple. A suitable thermocouple 30 of this type is available from Omega Engineering Limited, Manchester, United Kingdom M44 5BD. The thermocouple 30 is used to determine when to perform the various stages of the pull test and to allow the temperature profile of the melting and solidifying stages to be controlled so as to closely mimic those in the manufacturing process of the semiconductor assembly 2. The rate of heating and cooling can affect the material properties of the bond 31.

Figure 6:
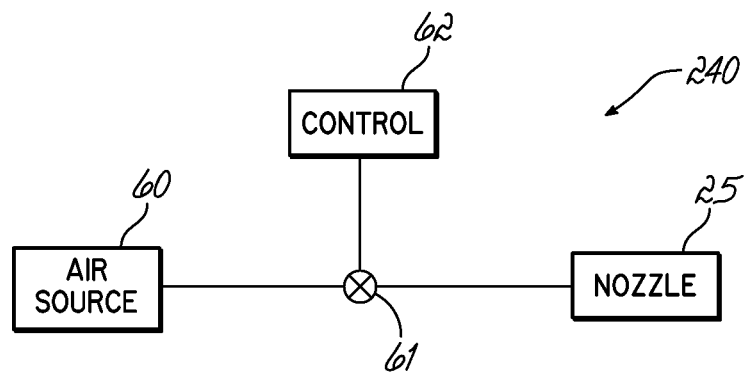
FIG. 6 is a schematic illustration of the cooling system partially shown in FIG. 3.

A cooling assembly 240, illustrated schematically in FIG. 6, is also provided in order to cool the probe 3 rapidly once the bond 31 under test has melted. The cooling assembly 240 operates by providing a jet of compressed air in the vicinity the probe 3. A source of compressed air 60 is connected to a nozzle 25 (shown in FIG. 3) located close to the probe 3, within the heater shield 24. An electronically controllable valve 61 is provided between the source of compressed air 60 (which may be the same or different to the source of compressed air 40 used for the clamp mechanism 220) and the nozzle 25. The connection between the air source 60, the valve 61 and the nozzle 25 may be made by suitable flexible or rigid hoses. The air source may be a cylinder of compressed air that can be mounted to the chassis 5. The control 62 used to control valve 61 is also shown in FIG. 6. Other forms of cooling may be provided as an alternative. For example, a fan for generating a flow of non-compressed air over the probe 3 and bond 31 may be used, or alternatively the probe 3 and bond 31 may simply be allowed to cool to the ambient temperature unaided.

The ceramic tube 21 and the probe 3 have relatively low thermal mass compared with the heater block of the prior art, and so the heating and cooling cycles are much faster.

Figure 7:
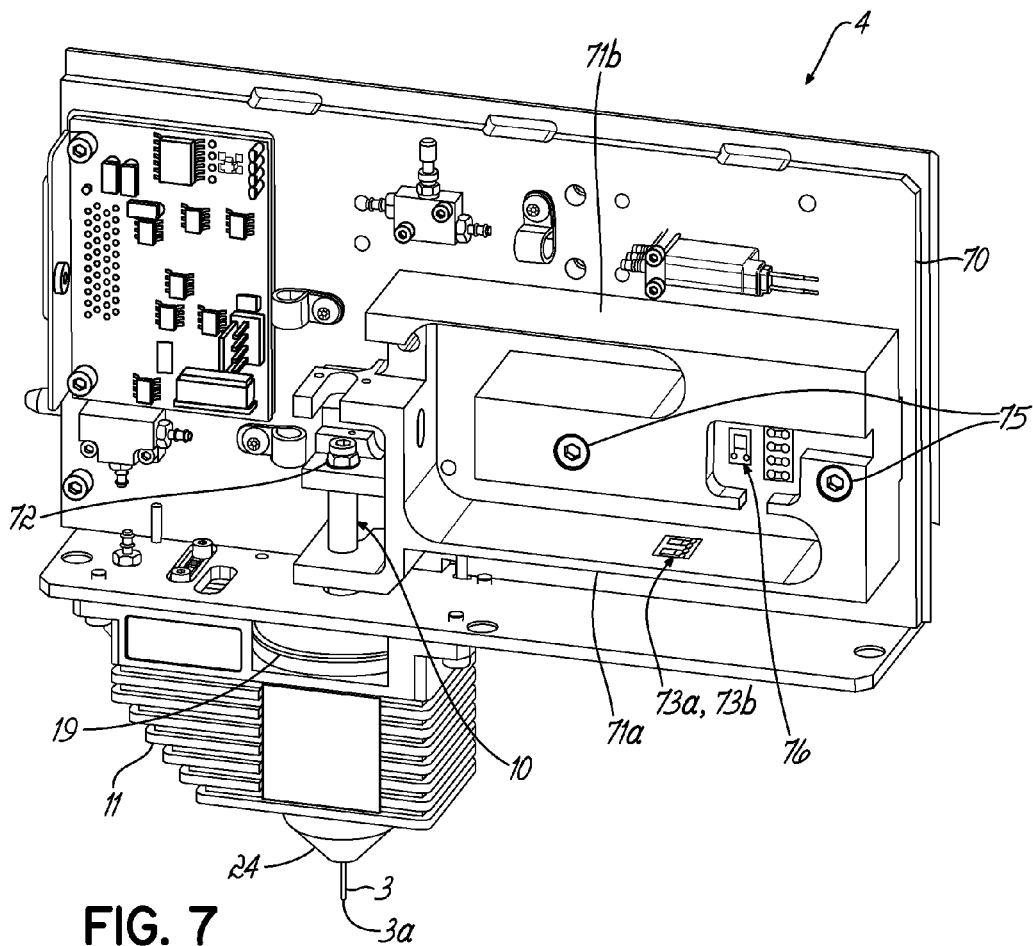
FIG. 7 is a detailed view of the cartridge assembly shown in FIGS. 1 and 2, with the cover removed.

FIG. 7 illustrates the cartridge assembly 4 and the manner in which forces on the probe 3 are detected. The cartridge comprises a rigid backplate 70, which is rigidly connected to the nut on the leadscrew 8. A pair of aluminium cantilever arms 71a, 71b are fixed at one end to the backplate 70 using bolts 75 and are free to flex in the Z direction at their opposite ends. Cantilever arms 71a, 71b of this type are well known and found in the Dage 4000 Multipurpose BondTester referenced above. The pull shaft 10 passes through apertures provided in the free ends of the cantilever arms 71a, 71b and is rigidly fixed to the cantilever arms 71a, 71b using a nut 72 fitted to a threaded portion of the pull shaft 10. Clearly, other means of attaching the pull shaft 10 to the cantilever arms 71a, 71b are possible.

Any force exerted on the pull shaft 10 in the Z direction will cause the cantilever arms 71a, 71b to flex. In order to measure the force exerted on the pull shaft 10, strain gauges 73a, 73b are located on the top surface of one of the cantilever arms 71a and strain gauges 74a, 74b (not shown in FIG. 7) are located on the opposite surface of that cantilever arm 71a. The flexing of the arm 71a distorts the strain gauges 73a, 73b, 74a, 74b and allows a measure of the force on the pull shaft 10 to be recorded. This type of force measurement system is known, for example from U.S. Pat. No. 6,301,971 and the Dage 4000 Multipurpose BondTester referenced above.

Figure 8:
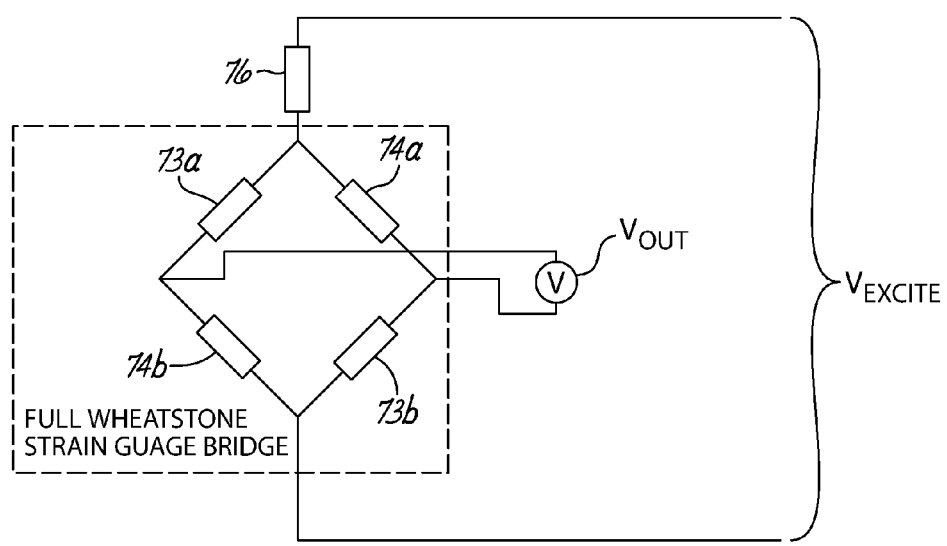
FIG. 8 is a circuit diagram illustrating how the strain gauges in FIG. 7 are used to provide a force measurement.

A temperature compensation element 76 is provided with the cantilever arms 71a, 71b. FIG. 8 illustrates a circuit arrangement using the four strain gauges 73a, 73b, 74a, 74b and the temperature compensation element 76. The circuit uses a Wheatstone Bridge configuration for the strain gauges, which is excited using excitation voltage $V_{excite}$. The output voltage $V_{out}$ is an indication of the force on the pull shaft 10.

The strain gauges 73a, 73b, 74a, 74b are used not only to detect the force on the pull shaft 10 during the pull or push test, but also to determine when the probe 3 contacts the bond 31 under test during initial positioning of the probe 3, prior to commencing the test. The small deflection of the cantilever arms 71a, 71b as the probe 3 contacts the semiconductor assembly 2 is detected and the Z direction drive is then stopped to prevent damage to the bond 31 or substrate 2.

Figure 9:
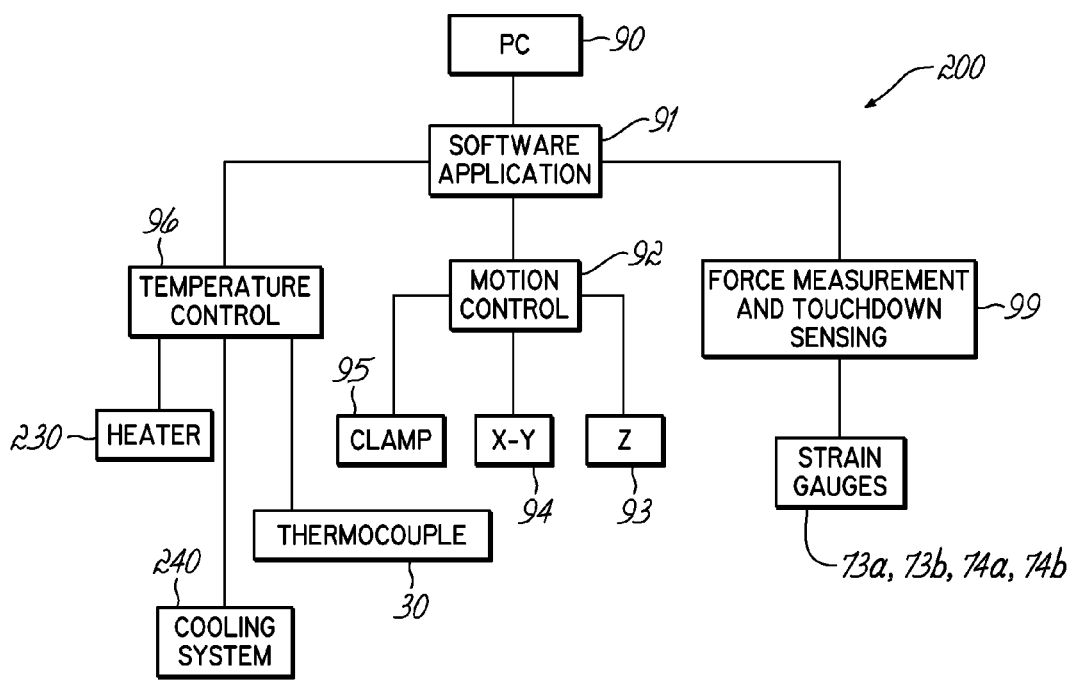
FIG. 9 is a schematic diagram showing the control architecture of an apparatus in accordance with the invention.

FIG. 9 is a schematic illustration of the control of the different parts of the machine 200. The machine 200 is controlled by application software 91 running on a personal computer (PC) 90. Dedicated electronics are provided for various parts of the machine 200, which are controlled by the application. Motion control electronics 92 are provided for the Z direction drive 93 of the cartridge assembly 4, and for the X-Y plane drive 94 of the stage table 1. Clamp electronics 95 are also provided to control actuation of the clamping mechanism 220, and specifically to control valves 41 and 42.

Temperature sensing and control electronics 96 are provided to control the heater 230 and the cooling system 240. Signals from the thermocouple 30 are used by the temperature control electronics 96 to start and finish the heating and cooling cycles.

Force measurement and touchdown sensing electronics 99 are provided to operate the strain gauges 73a, 73b, 74a, 74b and to determine a measure of the force on the pull shaft 10 from their output. As mentioned above, signals from the strain gauges 73a, 73b, 74a, 74b are used as a touchdown sensor to stop the Z direction drive 93 when the probe 3 is first positioned.

Figure 10:
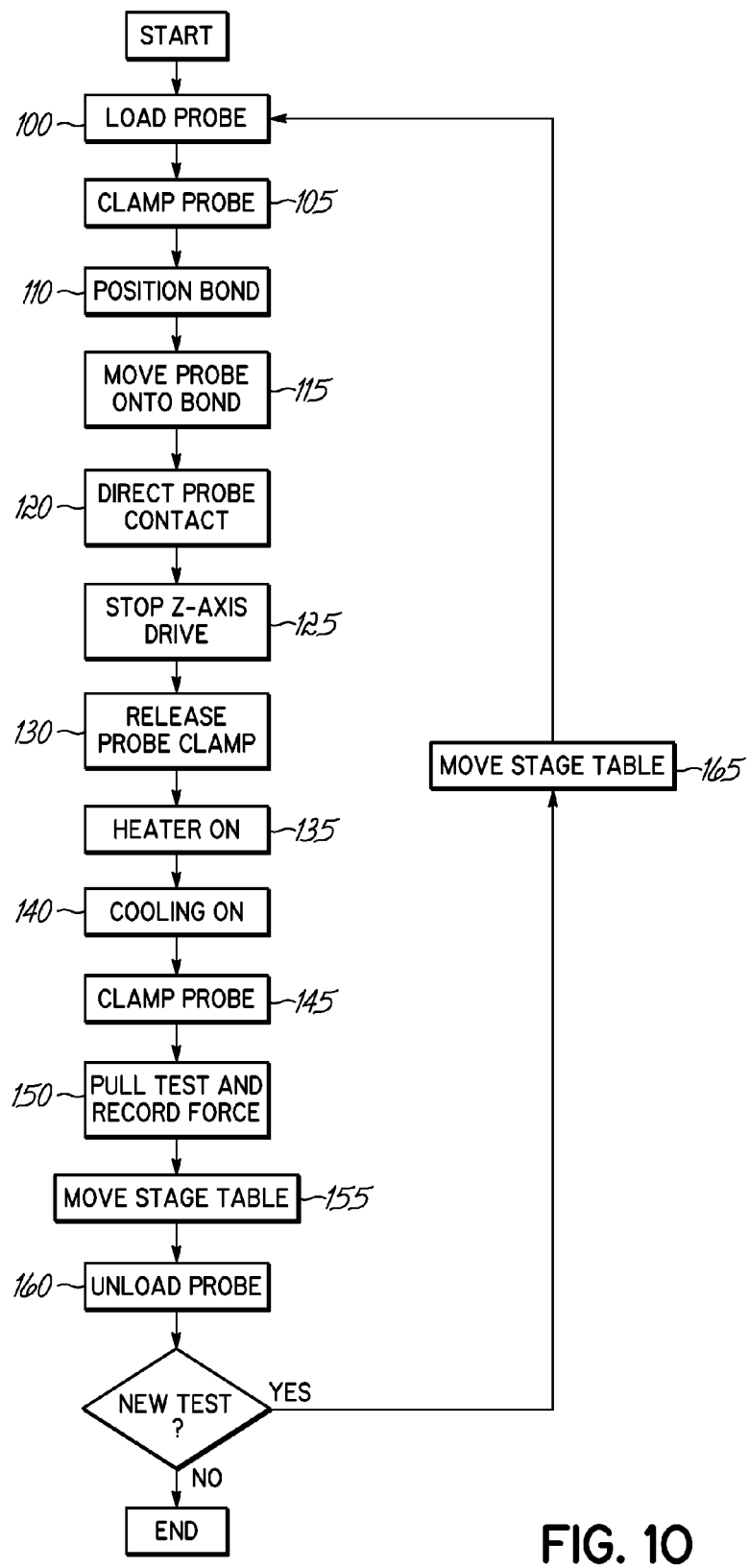
FIG. 10 is a flow diagram of a method of bond testing in accordance with the invention.

FIG. 10 is flow diagram illustrating the steps performed in a bond test in accordance with the invention.

The first step in the process is to load a probe 3 onto the pull shaft 10. This is shown as step 100. This can be achieved by manually loading a probe 3 into the holder 210 and then manually or automatically clamping the probe 3 in position. Alternatively the process may be completely automated. The stage table 1 may be moved so that a probe 3 in the tray of probes 80 is located directly beneath the pull shaft 10. By recording the position of the probes 3 in the tray 80 on the stage table 1, the stage table 1 may be controlled to automatically move the next probe 3 into position. The cartridge assembly 4 is then lowered using the Z direction drive 93 until the probe 3 is in position.

The probe 3 can then be clamped by actuating piston 13 in step 105, or it may be that the collet 12 is sufficiently tight without actuating the piston 13 to support the probe 3 in place against its weight so that clamping is not necessary at this stage. The probe 3 and cartridge assembly 4 is then withdrawn a predetermined distance above the stage table 1.

The stage table 1 is then moved so that the bond 31 to be tested is directly underneath the probe 3 in step 110. This can be done manually, with the aid of the microscope 9 and joystick controls (not shown). Alternatively it may be done automatically if the position of the bond 31 on the stage table is known and electronically recorded.

In step 115, the probe 3 is then moved down towards the bond 31 to be tested using the Z direction drive 93. In step 120, contact with the bond 31 is detected using output from the strain gauges 73a, 73b, 74a, 74b and the Z direction drive 93 is then stopped in step 125.

In step 130 the probe 3 is unclamped or loosened so that the probe 3 rests on the top of the bond 31. The heater 230 is then activated in step 135 to heat the probe 3 and so heat the bond 31. When the thermocouple 30 detects that the probe 3 has reached a predetermined temperature at or above the melting temperature of the bond 31, the heater 230 is stopped. The probe 3 sinks into the melting bond 31 under its own weight. Alternatively, the probe 3 may remain clamped during the heating step, but held in a position so that the solid bond 31 exerts an upward force on the probe 3, causing the cantilever arms 71a, 71b to flex. As the bond 31 melts the probe 3 is then forced downwards into the molten solder by the action of the cantilever arms 71a, 71b.

In step 140 the cooling cycle begins. The valve 61 is opened and a jet of compressed air is directed onto the probe 3 to rapidly cool it and the bond 31. When the thermocouple 30 detects that a desired temperature, at which the bond 31 is solid, has been reached, the valve 61 is closed and cooling is stopped. At this point the bond 31 has solidified around the tip 3a of the probe 3.

The thermocouple 30 can be used to provide a record of the temperature profile of the probe 3 during the heating and cooling cycles. This can be used to control the rate of heating and cooling and so ensure that the re-solidified bond 31 has close to the same material properties as the original bond 31 following manufacture. This is done by mimicking the thermal profile used in the typical manufacturing process as closely as possible.

After cooling is completed, if the probe 3 is unclamped, in step 145 the probe 3 is tightly clamped using the pneumatic clamping mechanism 220. Alternatively the step 145 of clamping the probe may be carried out prior to the step 140 of cooling. Alternatively, the probe 3 may remain clamped throughout the process.

In step 150, the pull test is performed and the force on the pull shaft 10 recorded throughout the test using the output from the strain gauges 73a, 73b, 74a, 74b. The pull test is performed by driving the pull shaft 10 in the Z direction away from the stage table 1 using the Z axis drive 93. When the bond 31 is removed from the semiconductor substrate 2 during the pull test there will be a sudden reduction in the force exerted on the pull shaft 10. The maximum force achieved is recorded.

It can be seen from FIGS. 2, 3, and 7 that in the illustrated embodiment the longitudinal axis of the probe 3 is aligned with the longitudinal axis of the pull shaft 10, and that the pull force exerted on the probe 3 by the pull shaft 10 during a pull test is directly in line with the longitudinal axis of the probe 3. This ensures that there are no bending moments on the probe 3 that might lead to inaccurate and unrepeatable test results. It also increase the maximum pull force that can be applied and significantly reduces the likelihood of damage to the probe 3 during a pull or push test, and so increases the useful lifetime of the probes 3.

As well as being suitable for performing pull tests, the machine 200 of the present invention is also suitable for performing push tests on bonds 31, by driving the probe 3 into the bond 31 in the Z direction (without melting) and recording the force on the pull shaft 10 as is travels over a predetermined linear distance. It is also possible to perform a fatigue test, consisting of a series of alternating pull and push tests up to a predetermined number of cycles or a predetermined force.

Following completion of the pull test (or push or fatigue test) the semiconductor assembly 2 is moved away from the probe 3 by moving the stage table 1 in step 155. To facilitate cleaning of the probe 3, any bond material that is attached to the probe 3 may be re-melted while it is still attached to the holder 210 and housed within the ceramic heating tube 21. A new semiconductor assembly 2 may be mounted on the stage table 1 if desired.

In step 160, the probe 3 is unloaded from the holder 210. This can be done manually by rotating the plate 19 to move it upwardly to open collet 12, or automatically by releasing the pneumatic clamping force. A receptacle 250 (schematically shown in FIG. 2) for receiving used probes 3 may be fixed to the stage table 1 and moved underneath the pull shaft 10 at this stage. The probe 3 can then fall into the receptacle 250 on being unclamped and can be subsequently cleaned and reused.

The process is then complete and a new bond 31 can be tested. To start the process again the stage table 1 is moved into a position to receive a new probe 3 in step 165, and the process begins again at step 100.

The invention claimed is:
1. An apparatus for applying a pull test to a bond of a semi-conductor assembly, the bond comprising a ball or a bump of solder, the apparatus comprising:
  a probe, said probe comprising a straight, thermally conductive pin;
  a vertically movable cartridge assembly including:
    a) an actuator;
    b) a heated tube including an upper end and a lower end, the probe being inserted upwardly through the lower end and received in the heated tube for heating a tip of said probe to a temperature at or above a temperature at which the bond is melted; and
    c) a holder for supporting said probe, the holder comprising a clamping mechanism located above the heated tube, the actuator moving a part of the clamping mechanism to provide a clamping force on the probe, the clamping mechanism movable by the actuator between a clamping position and a release position, wherein the clamping mechanism provides the clamping force on the probe when in the clamping position to prevent movement of the probe relative to the clamping mechanism and said probe is free to be removed from the clamping mechanism and downwardly through the heated tube when the clamping mechanism is in the release position;
  an actuation device for moving said cartridge assembly and said probe up and down;
  a pull force applier for applying a pull force on said holder which in turn applies a pull force to said probe; and
  a force measuring system for measuring a force applied to said probe during the pull test, wherein after said probe tip has been heated to a temperature at or above a temperature at which the bond is melted, said probe tip is brought into contact with the bond, the bond is melted by heating of the probe and the bond is cooled and solidified to fix the probe tip in the bond, the probe is then retracted by the pull force applier to apply a pull force to the bond, which pull force is measured by said force measuring system.

2. An apparatus according to claim 1, wherein the apparatus further comprises a plurality of probes arranged in predetermined positions, and an automatic probe loading mechanism configured to move either the cartridge assembly or at least one of the probes, to bring a probe into alignment with the heated tube.

3. An apparatus according to claim 1, wherein the apparatus further comprises a collection receptacle that can be positioned underneath the heated tube to receive used probes following a test.

4. An apparatus according to claim 1, further comprising a movable platform on which a semiconductor sample to be tested is mounted, and an array of probes mounted on the movable platform.

5. An apparatus according to claim 1, wherein the clamping mechanism comprises:
  a collet surrounding the probe, the collet having a tapered external surface, and a piston, wherein, in use, actuation of the piston causes the piston to travel along the tapered surface, or causes the tapered surface to be driven against a surface of the holder, to clamp the collet around the probe.

6. An apparatus according to claim 1, wherein the heated tube comprises a thermally conductive tube which surrounds at least a part of said probe, and a heating element which surrounds at least a part of said tube.

7. An apparatus according to claim 6, wherein the heated tube is not electrically conductive.

8. An apparatus according to claim 6, wherein the heated tube is formed from a ceramic material.

9. An apparatus according to claim 1 further comprising a thermocouple located adjacent to the probe.

10. An apparatus according to claim 9, wherein the thermocouple is located on the heated tube.

11. An apparatus according to claim 1, further comprising a thermal shield surrounding the heated tube.

12. An apparatus according to claim 1, further comprising a cooling system for cooling the probe.

13. An apparatus according to claim 12, wherein the cooling system comprises a source of compressed air, a nozzle connected to the source of compressed air, the nozzle arranged to provide a jet of compressed air in the vicinity of the probe, and a valve configured to control the supply of compressed air from the source to the nozzle.

14. A method of testing a bond on a semiconductor assembly, the bond comprising a ball or a bump of solder, the method comprising the steps of:
  providing a plurality of thermally conductive probes at predetermined positions;
  moving at least one of the probes under automatic control relative to a vertically movable cartridge assembly including an actuator, a probe holder and a heated tube to bring that probe into alignment with the heated tube;
  inserting the probe upwardly into the heated tube;
  clamping the probe to the probe holder by using the actuator to move part of a clamping mechanism located above the heated tube to a clamping position that places a clamping force on the probe,
  moving the cartridge assembly and the probe relative to the bond to contact the bond with a tip of the probe;
  heating the tip of said probe with the heated tube to a temperature at or above a temperature at which the bond is melted;
  cooling the tip of the probe, or allowing the tip of the probe to cool, to a temperature at which the bond is solidified, wherein the tip of the probe is embedded in the bond;
  applying a pull force on the probe through the probe holder, and recording the force applied to the probe during the step of applying a pull force;
  moving a receptacle relative to the probe holder; and
  placing the clamping mechanism in a release position to reduce the clamping force on the probe and release the probe from the probe holder and downwardly out of the heated tube into the receptacle.

15. A method according to claim 14, wherein the step of moving either at least one of the probes or a probe holder under automatic control comprises moving the at least one of the probes laterally to a position underneath the heated tube.

16. A method according to claim 14, wherein the step of providing a plurality of thermally conductive probes at predetermined positions comprises mounting a carrier tray holding the probes to a movable platform.

17. A method according to claim 14, wherein each of the probes is a straight pin.

18. A method of testing a bond on a semiconductor assembly, the bond comprising a ball or a bump of solder, the method comprising the steps of:

providing a thermally conductive probe;

moving the probe relative to a vertically movable cartridge assembly including an actuator, a probe holder and a heated tube to bring the probe into alignment with the heated tube;

inserting the probe upwardly into the heated tube;

clamping the probe to the probe holder by using the actuator to move part of a clamping mechanism located above the heated tube to a clamping position that places a clamping force on the probe, moving the cartridge assembly and the probe relative to the bond to contact the bond with a tip of the probe;

heating the tip of the probe with the heated tube to a temperature at or above a temperature at which the bond is melted;

cooling the tip of the probe, or allowing the tip of the probe to cool, to a temperature at which the bond is solidified, wherein the tip of the probe is embedded in the bond;

applying a pull force on the probe through the probe holder;

recording the force applied to the probe;

moving a receptacle relative to the probe holder; and placing the clamping mechanism in a release position to reduce the clamping force on the probe and release the probe from the probe holder and downwardly out of the heated tube into the receptacle.

\* \* \* \* \*